(12) United States Patent
Yu

(10) Patent No.: US 9,891,034 B2
(45) Date of Patent: Feb. 13, 2018

(54) COORDINATE SENSING SYSTEM, COORDINATE SENSING METHOD AND DISPLAY SYSTEM

(71) Applicant: QISDA CORPORATION, Taoyuan County (TW)

(72) Inventor: Chun-Kun Yu, Taoyuan County (TW)

(73) Assignee: Qisda Corporation, Taoyuan (TW)

( * ) Notice: Subject to any disclaimer, the term of this patent is extended or adjusted under 35 U.S.C. 154(b) by 1062 days.

(21) Appl. No.: 13/769,844

(22) Filed: Feb. 19, 2013

(65) Prior Publication Data

US 2013/0218516 A1   Aug. 22, 2013

(30) Foreign Application Priority Data

Feb. 20, 2012   (TW) .............................. 101105443 A

(51) Int. Cl.
*G01B 7/004* (2006.01)
*G06F 3/046* (2006.01)
*G06F 3/0354* (2013.01)
*G06K 9/22* (2006.01)
*G06F 3/03* (2006.01)

(52) U.S. Cl.
CPC ............ *G01B 7/004* (2013.01); *G06F 3/046* (2013.01); *G06F 3/0317* (2013.01); *G06F 3/03545* (2013.01); *G06K 9/22* (2013.01); *G06K 9/222* (2013.01)

(58) Field of Classification Search
None
See application file for complete search history.

(56) References Cited

U.S. PATENT DOCUMENTS

| 5,654,529 | A | 8/1997 | Yeung | |
|---|---|---|---|---|
| 5,902,968 | A | 5/1999 | Sato | |
| 7,283,127 | B2 * | 10/2007 | Taylor | G06F 3/0346 178/18.01 |
| 7,489,307 | B2 | 2/2009 | Tanaka | |
| 7,961,909 | B2 * | 6/2011 | Mandella | G01B 21/04 178/18.01 |
| 2002/0180714 | A1 | 12/2002 | Duret | |
| 2013/0009907 | A1 * | 1/2013 | Rosenberg | G06F 3/046 345/174 |

(Continued)

FOREIGN PATENT DOCUMENTS

CN            1877508 A       12/2006

*Primary Examiner* — Gregory J. Toatley
*Assistant Examiner* — Terence Stifter, Jr.

(57) ABSTRACT

A coordinate sensing system includes a magnetic member, a direction sensor, a first magnetic sensor and a processor, wherein the processor communicates with the direction sensor and is electrically connected to the first magnetic sensor. The magnetic member has a magnetic dipole moment. The direction sensor is used for sensing a direction of the magnetic dipole moment. The first magnetic sensor is used for sensing a first magnetic field of the magnetic member. The processor is used for calculating a first distance between the magnetic member and the first magnetic sensor and calculating a direction of the first distance according to a value of the magnetic dipole moment, the direction of the magnetic dipole moment and the first magnetic field. The processor is further used for calculating a coordinate of the magnetic member according to the first distance and the direction of the first distance.

25 Claims, 9 Drawing Sheets

(56) References Cited

U.S. PATENT DOCUMENTS

2014/0243750 A1* 8/2014 Larsen ................ A61M 5/1452
604/189
2014/0327659 A1* 11/2014 Chen ....................... G06F 3/046
345/179

* cited by examiner

COORDINATE SENSING SYSTEM, COORDINATE SENSING METHOD AND DISPLAY SYSTEM

BACKGROUND OF THE INVENTION

1. Field of the Invention

The invention relates to a coordinate sensing system and a coordinate sensing method and, more particularly, to a coordinate sensing system and a coordinate sensing method utilizing a direction sensor and at least one magnetic sensor to sense a 3D coordinate of a magnetic member in a space. Specifically, the aforesaid coordinate sensing system and coordinate sensing method can be applied to a display system.

2. Description of the Prior Art

As motion control gets more and more popular, the present operation behavior of user may change in the future, wherein gesture control may be adapted for various applications. To recognize a gesture performed by a user in a space precisely, it needs to calculate a 3D coordinate of a device (e.g. presentation pen, game joystick, remote controller, etc.), which is operated by the user to perform the gesture in the space, precisely. The prior art usually utilizes a camera to capture an image of the user and then analyzes the captured image, so as to sense the 3D coordinate of the device in the space. The disadvantage of the aforesaid manner is that the camera must have high resolution and cooperate with complicated image processing algorithm. Consequently, it is necessary to use a high-level computation processor to execute the complicated image processing algorithm. Accordingly, the cost of an electronic product will increase.

SUMMARY OF THE INVENTION

Therefore, an objective of the invention is to provide a coordinate sensing system and a coordinate sensing method utilizing a direction sensor and at least one magnetic sensor to sense a 3D coordinate of a magnetic member in a space, so as to solve the aforesaid problems.

Another objective of the invention is to provide a display system equipped with the aforesaid coordinate sensing system and coordinate sensing method.

According to an embodiment of the invention, a coordinate sensing system comprises a magnetic member, a direction sensor, a first magnetic sensor and a processor, wherein the processor communicates with the direction sensor and is electrically connected to the first magnetic sensor. The magnetic member has a magnetic dipole moment. The direction sensor is used for sensing a direction of the magnetic dipole moment. The first magnetic sensor is used for sensing a first magnetic field of the magnetic member. The processor is used for calculating a first distance between the magnetic member and the first magnetic sensor and calculating a direction of the first distance according to a value of the magnetic dipole moment, the direction of the magnetic dipole moment and the first magnetic field. The processor is further used for calculating a coordinate of the magnetic member according to the first distance and the direction of the first distance.

According to another embodiment of the invention, a coordinate sensing method comprises steps of sensing a direction of a magnetic dipole moment of a magnetic member by a direction sensor; sensing a first magnetic field of the magnetic member by a first magnetic sensor; calculating a first distance between the magnetic member and the first magnetic sensor and calculating a direction of the first distance according to a value of the magnetic dipole moment, the direction of the magnetic dipole moment and the first magnetic field; and calculating a coordinate of the magnetic member according to the first distance and the direction of the first distance.

According to another embodiment of the invention, a display system comprises a display device and a coordinate sensing system. The display device is used for displaying an object. The coordinate sensing system comprises a handheld device and a coordinate sensing device. The handheld device comprises a magnetic member and a direction sensor. The magnetic member has a magnetic dipole moment. The direction sensor is used for sensing a direction of the magnetic dipole moment. The coordinate sensing device comprises a communication module, a first magnetic sensor and a processor, wherein the processor is electrically connected to the communication module and the first magnetic sensor. The communication module is used for communicating with the display device and the direction sensor. The first magnetic sensor is used for sensing a first magnetic field of the magnetic member. The processor is used for calculating a first distance between the magnetic member and the first magnetic sensor and calculating a direction of the first distance according to a value of the magnetic dipole moment, the direction of the magnetic dipole moment and the first magnetic field. The processor is further used for calculating a coordinate of the magnetic member according to the first distance and the direction of the first distance. The processor transmits the coordinate of the magnetic member to the display device through the communication module. The display device controls the object according to the coordinate of the magnetic member.

As mentioned in the above, the coordinate sensing system and the coordinate sensing method of the invention utilizes the direction sensor and at least one magnetic sensor to sense a 3D coordinate of the magnetic member in a space. In practical applications, the magnetic member and the direction sensor may be disposed in a handheld device including presentation pen, game joystick, remote controller, and so on, such that a user can operate the handheld device to perform a gesture to control an electronic device (e.g. display device) to execute specific function (e.g. eraser function, palm function, 3D drawing function, handwriting input function, cursor moving function, etc.).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
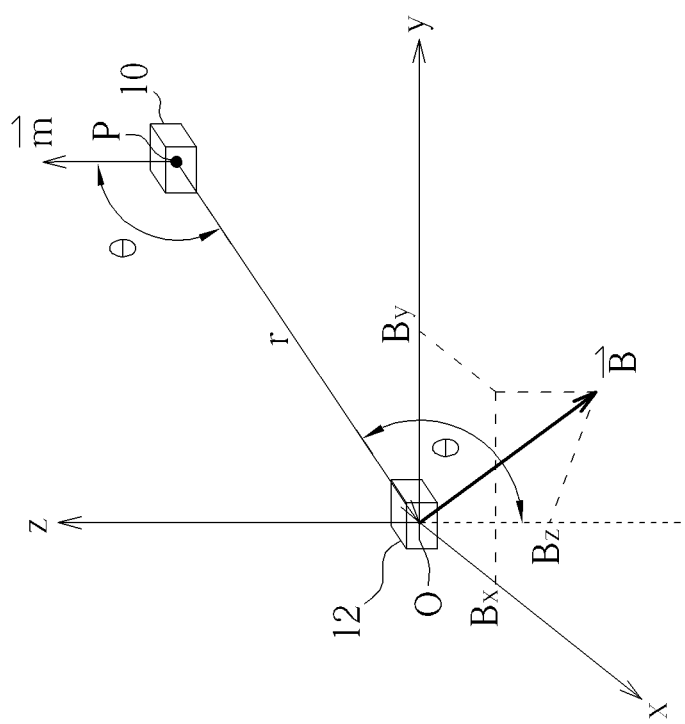
FIG. 1 is a schematic diagram illustrating a magnetic member located at a random point relative to a magnetic sensor in a space.

Referring to FIG. 1, FIG. 1 is a schematic diagram illustrating a magnetic member 10 located at a random point P relative to a magnetic sensor 12 in a space. As shown in FIG. 1, the magnetic member 10 is located at the point P and the point O, where the magnetic sensor 12 is located at, is an origin of the coordinates, wherein $\vec{m}$ represents a magnetic dipole moment of the magnetic member 10 at the point P and the direction of the magnetic dipole moment $\vec{m}$ is parallel to a coordinate axis z of the Cartesian coordinate system; $\vec{B}$ represents a magnetic field of the magnetic member 10 sensed by the magnetic sensor 12 relative to the point O; $B_x$, $B_y$ and $B_z$ represent three components of the magnetic field $\vec{B}$ relative to the coordinate axes x, y and z; r represents the distance between the magnetic member 10 and the magnetic sensor 12; and θ represents an angle included between the distance r and the coordinate axis z (i.e. the angle included between the magnetic dipole moment $\vec{m}$ and the radial direction $\hat{r}$). Therefore, the magnetic field $\vec{B}$ of the magnetic member 10 sensed by the magnetic sensor 12 relative to the point O can be calculated by the following equation 1 in polar coordinates.

$$\vec{B} = B_x\hat{i} + B_y\hat{j} + B_z\hat{k} = \frac{\mu_0}{4\pi r^3}[3(\vec{m}\cdot\hat{r})\hat{r} - \vec{m}] = \frac{\mu_0}{4\pi r^3}(3m\cos\theta\hat{r} - m\hat{k}), \text{ wherein } \hat{i}, \hat{j}$$
Equation 1 and $\hat{k}$ represent three unit vectors of the coordinate axes x, y and z, $\mu_0$ represents a permittivity of the air, and $\hat{r}$ represents a unit vector of the distance r in a direction from the point P to the point O.

A component of the magnetic field $\vec{B}$ relative to the coordinate axis z can be calculated by the following equation 2.

$$\vec{B}_z = \frac{\mu_0}{4\pi r^3}[3m\cos^2\theta\hat{k} - m\hat{k}] = \frac{\mu_0 m}{4\pi r^3}(3\cos^2\theta - 1)\hat{k}.$$
Equation 2

The following equation 3 can be obtained by the equation 2.

$$3\cos^2\theta = \frac{4\pi r^3 B_z}{\mu_0 m} + 1.$$
Equation 3

In magnetism, the magnetic field $\vec{B}$ can be calculated in polar coordinates by the following equation 4.

$$\vec{B} = \frac{\mu_0 m}{4\pi r^3}(2\cos\theta\hat{r} + \sin\theta\hat{\theta}).$$
Equation 4

The following equation 5 can be obtained by the equations 3 and 4.

$$B = |\vec{B}| = \frac{\mu_0 m}{4\pi r^3}(1 + 3\cos^2\theta)^{\frac{1}{2}} = \frac{\mu_0 m}{4\pi r^3}\left(\frac{4\pi r^3 B_z}{\mu_0 m} + 2\right)^{\frac{1}{2}}.$$
Equation 5

It is assumed that $$R = \frac{\mu_0 m}{4\pi r^3}, \text{ put } R = \frac{\mu_0 m}{4\pi r^3}$$

into the equation 5, and square the equation 5 such that the following equations 6 and 7 can be obtained.

$$R = \frac{-B_z \pm \sqrt{B_z^2 + 8B^2}}{4}.$$
Equation 6

$$r^3 = \frac{\mu_0 m}{\pi\left(-B_z \pm \sqrt{B_z^2 + 8B^2}\right)}.$$
Equation 7

The negative value is unnecessary such that the following equation 8 can be obtained by the equation 7.

$$r = \left[\frac{\mu_0 m}{\left(\sqrt{8B^2 + B_z^2} - B_z\right)\pi}\right]^{\frac{1}{3}}, \text{ wherein}$$
Equation 8

$$B^2 = B_x^2 + B_y^2 + B_z^2.$$

The aforementioned equations 1 and 8 will be used to describe the features of the invention in the following.

Figure 2:
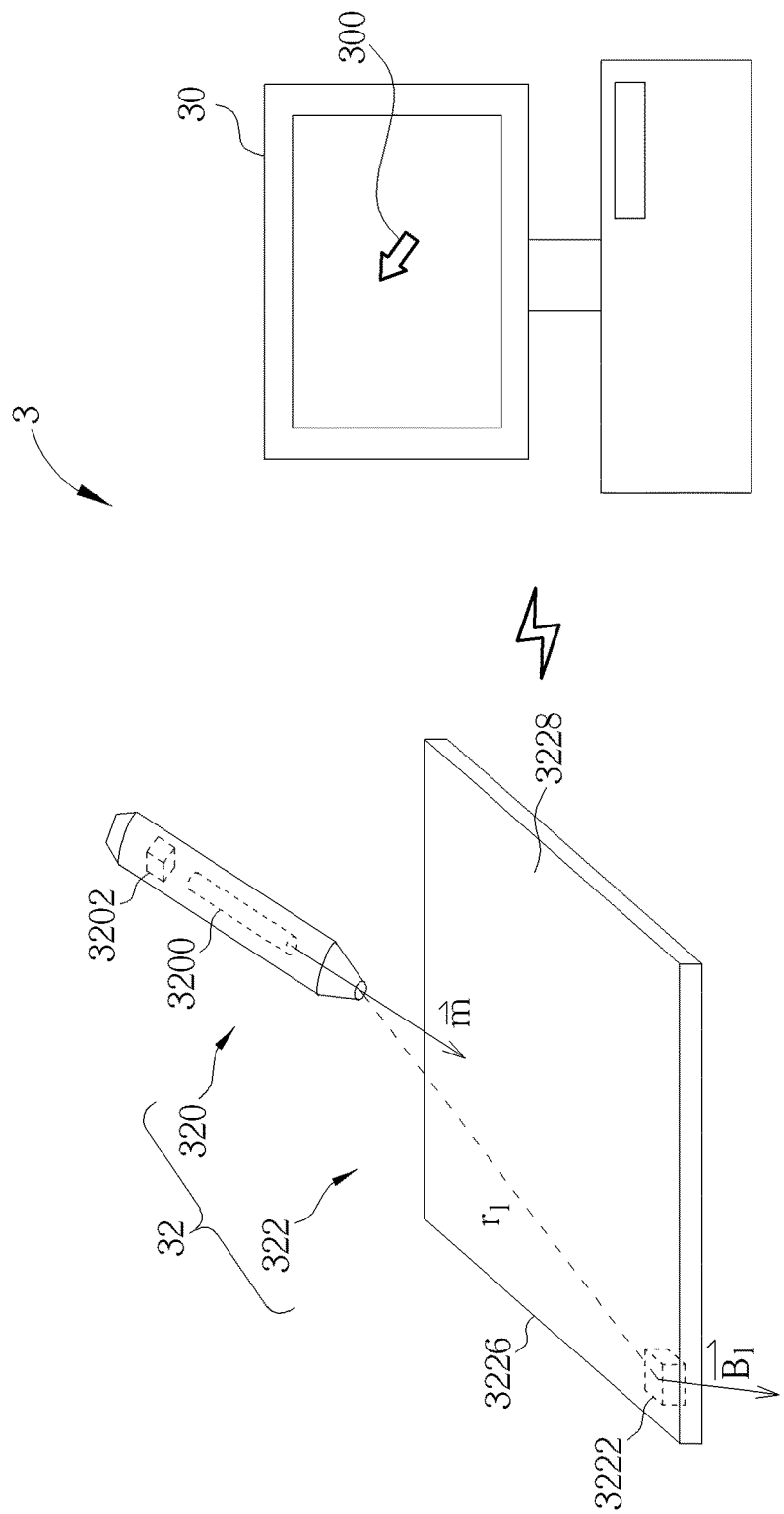
FIG. 2 is a schematic diagram illustrating a display system according to an embodiment of the invention.
Figure 3:
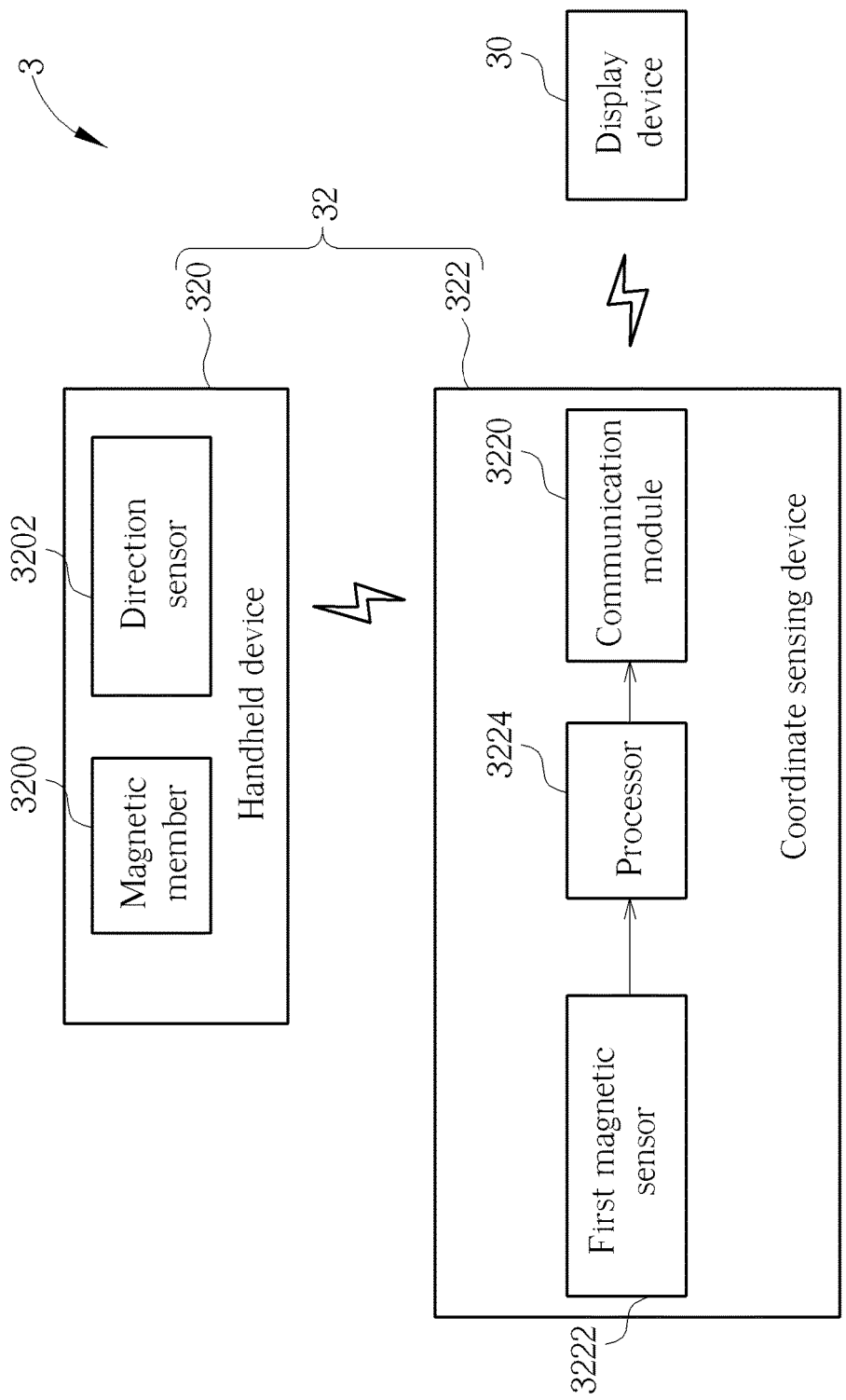
FIG. 3 is a functional block diagram illustrating the display system shown in FIG. 2.

Referring to FIGS. 2 and 3, FIG. 2 is a schematic diagram illustrating a display system 3 according to an embodiment of the invention, and FIG. 3 is a functional block diagram illustrating the display system 3 shown in FIG. 2. As shown FIGS. 2 and 3, the display system 3 comprises a display device 30 and a coordinate sensing system 32. The display device 30 is used for displaying an object 300 (e.g. cursor). The coordinate sensing system 32 comprises a handheld device 320 and a coordinate sensing device 322. The handheld device 320 comprises a magnetic member 3200 and a direction sensor 3202. The coordinate sensing device 322 comprises a communication module 3220, a first magnetic sensor 3222, a processor 3224 and a casing 3226. The communication module 3220, the first magnetic sensor 3222 and the processor 3224 are disposed in the casing 3226. The processor 3224 is electrically connected to the communication module 3220 and the first magnetic sensor 3222. The communication module 3220 may communicate with the display device 30 and the direction sensor 3202 in wired or wireless manner, wherein the wired or wireless communication is well known by one skilled in the art, so it will not be depicted herein. In practical applications, the display device 30 may be a liquid crystal display device, a smart TV, a projector or other electronic devices with display function; the handheld device 320 may be a presentation pen, a game joystick, a remote controller or other devices capable of being operated by a user; the magnetic member 3200 may be a magnet or other members with a magnetic dipole moment; the direction sensor 3202 may be a gyro or other direction sensors; the first magnetic sensor 3222 may be a three-axis magnetic sensor (e.g. Hall sensor) or other magnetic sensors; and the processor 3224 may be a processor or controller with data processing function.

In this embodiment, the magnetic member 3200 has a magnetic dipole moment $\vec{m}$. The direction sensor 3202 is used for sensing a direction of the magnetic dipole moment $\vec{m}$ of the magnetic member 3200 and transmitting the direction of the magnetic dipole moment $\vec{m}$ to the processor 3224 through the communication module 3220. The first magnetic sensor 3222 is used for sensing a first magnetic field $\vec{B}_1$ of the magnetic member 3200 and transmitting the first magnetic field $\vec{B}_1$ to the processor 3224. Afterwards, through the aforementioned equations 1 and 8, the processor 3224 can calculate a first distance $r_1$ between the magnetic member 3200 and the first magnetic sensor 3222 and calculate a direction of the first distance $\hat{r}_1$ according to a value of the magnetic dipole moment m, the direction of the magnetic dipole moment $\hat{m}$ and the first magnetic field $\vec{B}_1$. Then, by taking the first magnetic sensor 3222 to be the origin of the coordinates, the processor 3224 can calculate a coordinate of the magnetic member 3200 according to the first distance $r_1$ and the direction of the first distance $\hat{r}_1$. Then, the processor 3224 can transmit the coordinate of the magnetic member 3200 to the display device 30 through the communication module 3220. Then, the display device 30 can control the object 300 to execute a predetermined function according to the coordinate of the magnetic member 3200.

Figure 4:
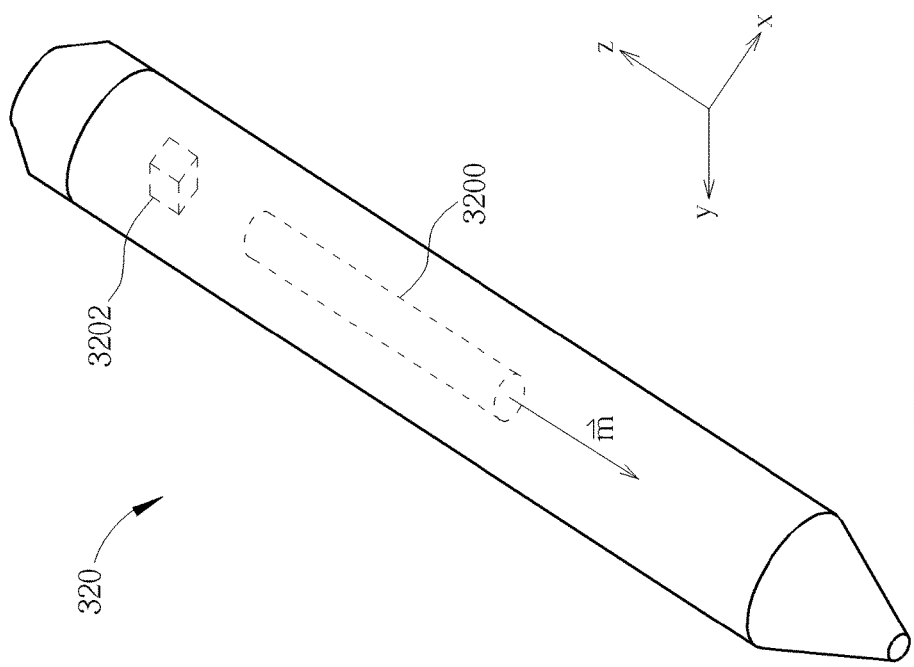
FIG. 4 is a schematic diagram illustrating the magnetic dipole moment of the magnetic member 3200 parallel to the coordinate axis of the Cartesian coordinate system.

Referring to FIG. 4, FIG. 4 is a schematic diagram illustrating the magnetic dipole moment $\vec{m}$ of the magnetic member 3200 parallel to the coordinate axis z of the Cartesian coordinate system. As shown in FIG. 4, when the direction of the magnetic dipole moment $\vec{m}$ is parallel to the coordinate axis z of the Cartesian coordinate system, the direction sensor 3202 may be a two-axis gyro or other two-axis direction sensors. It should be noted that the aforesaid coordinate axis z may also be another coordinate axis x or y. Furthermore, when the magnetic dipole moment $\vec{m}$ of the magnetic member 3200 is not parallel to any coordinate axis of the Cartesian coordinate system, the direction sensor 3202 has to be a three-axis gyro or other three-axis direction sensor.

Figure 5:
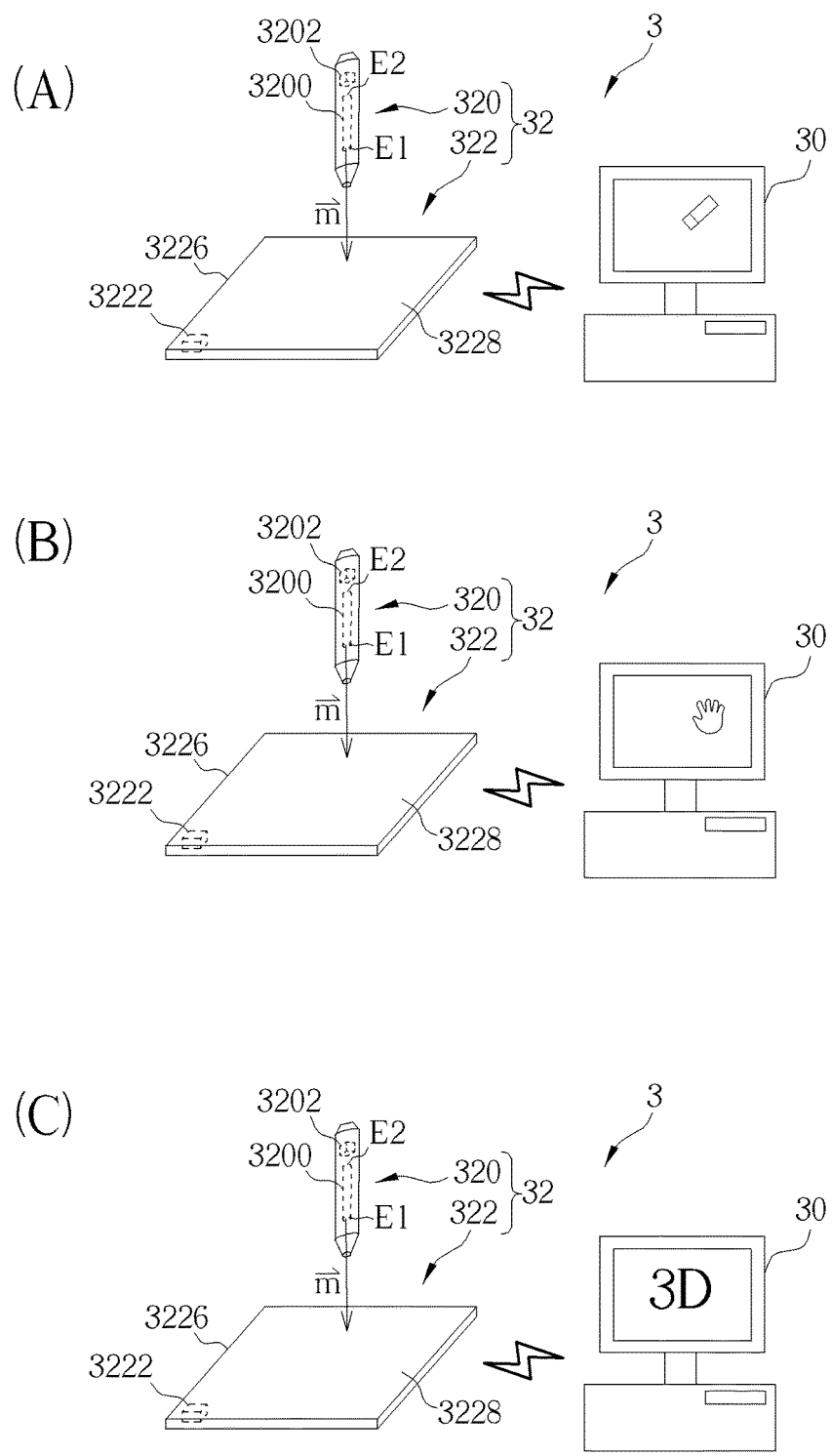
FIG. 5 is a schematic diagram illustrating the coordinate sensing system used for controlling the display device to execute a predetermined function.

Referring to FIG. 5, FIG. 5 is a schematic diagram illustrating the coordinate sensing system 32 used for controlling the display device 30 to execute a predetermined function. As shown in FIG. 5, an indication plane 3228 may be defined on the casing 3226. After the processor 3224 calculates the coordinate of the magnetic member 3200, the processor 3224 can transmit the coordinate of the magnetic member 3200 and the direction of the magnetic dipole moment $\hat{m}$ to the display device 30 through the communication module 3220. Then, the display device 30 executes a predetermined function according to the coordinate of the magnetic member 3200 and the direction of the magnetic dipole moment $\hat{m}$. For example, when a user operates the handheld device 320 to make an end E1 of the magnetic member 3200 face the indication plane 3228 (i.e. the magnetic dipole moment $\vec{m}$ is toward the indication plane 3228), the display device 30 will execute a predetermined function according to the coordinate of the magnetic member 3200, such as an eraser function shown in FIG. 5(A), a palm function shown in FIG. 5(B), or a 3D drawing function shown in FIG. 5(C). It should be noted that when the end E1 of the magnetic member 3200 faces the indication plane 3228, the predetermined function executed by the display device 30 can be designed according to practical applications and can be set by the user. In other words, the predetermined function executed by the display device 30 is not limited to the embodiments shown in FIG. 5.

Figure 6:
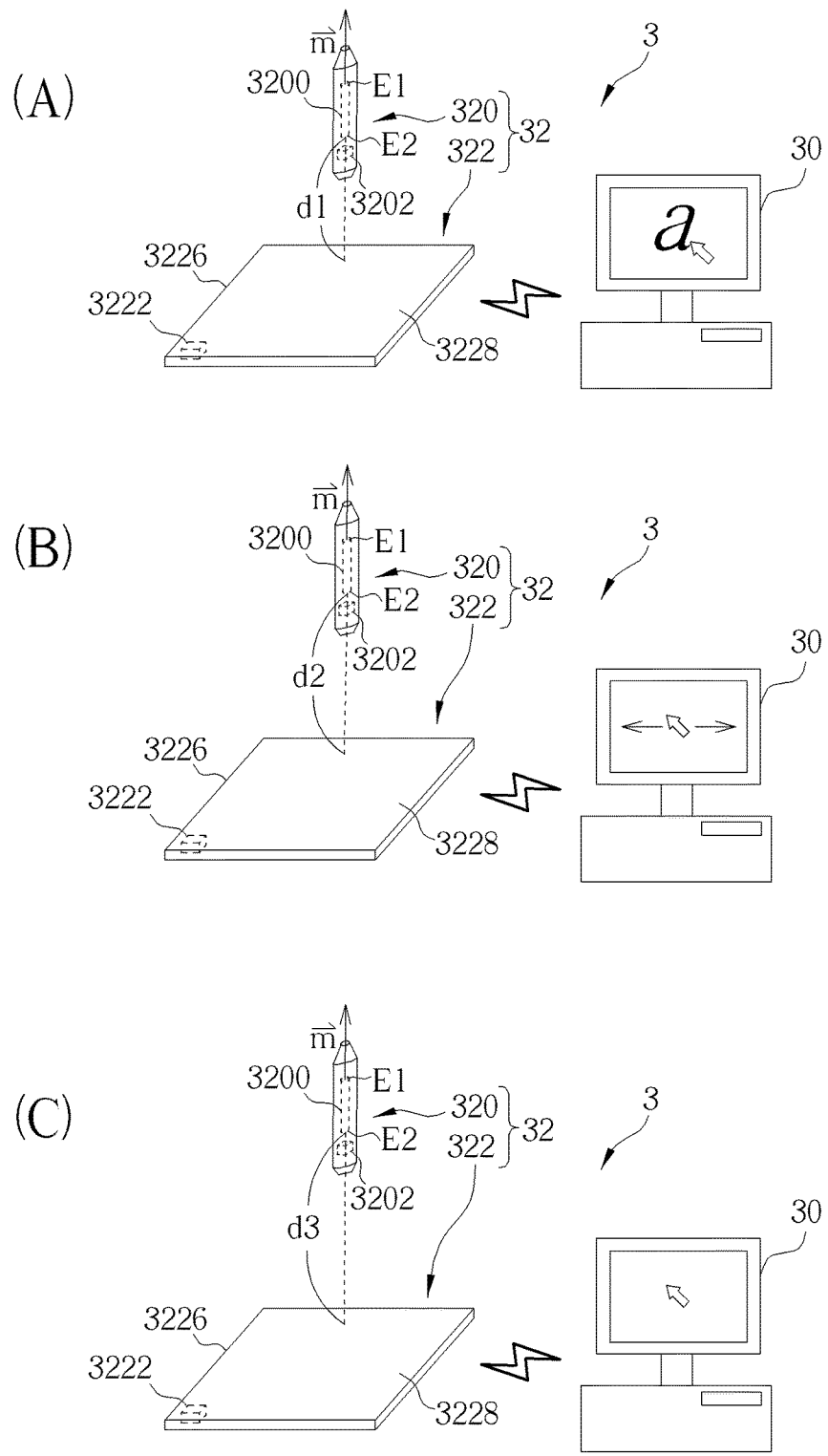
FIG. 6 is another schematic diagram illustrating the coordinate sensing system used for controlling the display device to execute a predetermined function.

Referring to FIG. 6, FIG. 6 is another schematic diagram illustrating the coordinate sensing system 32 used for controlling the display device 30 to execute a predetermined function. As shown in FIG. 6(A), when a user operates the handheld device 320 to make an end E2 of the magnetic member 3200 face the indication plane 3228 (i.e. the magnetic dipole moment $\vec{m}$ is away from the indication plane 3228) and a distance d1 between the end E2 and the indication plane 3228 is smaller than a first threshold (e.g. d1 is smaller than 3 cm), the display device 30 will execute a predetermined function according to the coordinate of the magnetic member 3200, such as a handwriting input function. As shown in FIG. 6(B), when the user operates the handheld device 320 to make a distance d2 between the end E2 of the magnetic member 3200 and the indication plane 3228 be larger than a second threshold (e.g. d2 is larger than 5 cm), the display device 30 will execute a predetermined function according to the coordinate of the magnetic member 3200, such as a cursor moving function. As shown in FIG. 6(C), when the user operates the handheld device 320 to make a distance d3 between the end E2 of the magnetic member 3200 and the indication plane 3228 be larger than a third threshold (e.g. d3 is larger than 10 cm), the first magnetic sensor 3222 cannot sense the magnetic member 3200 such that the display device 30 will enter an idle state. It should be noted that when the end E2 of the magnetic member 3200 faces the indication plane 3228, the predetermined function executed by the display device 30 can be designed according to practical applications and can be set by the user. In other words, the predetermined function executed by the display device 30 is not limited to the embodiments shown in FIG. 6.

Figure 7:
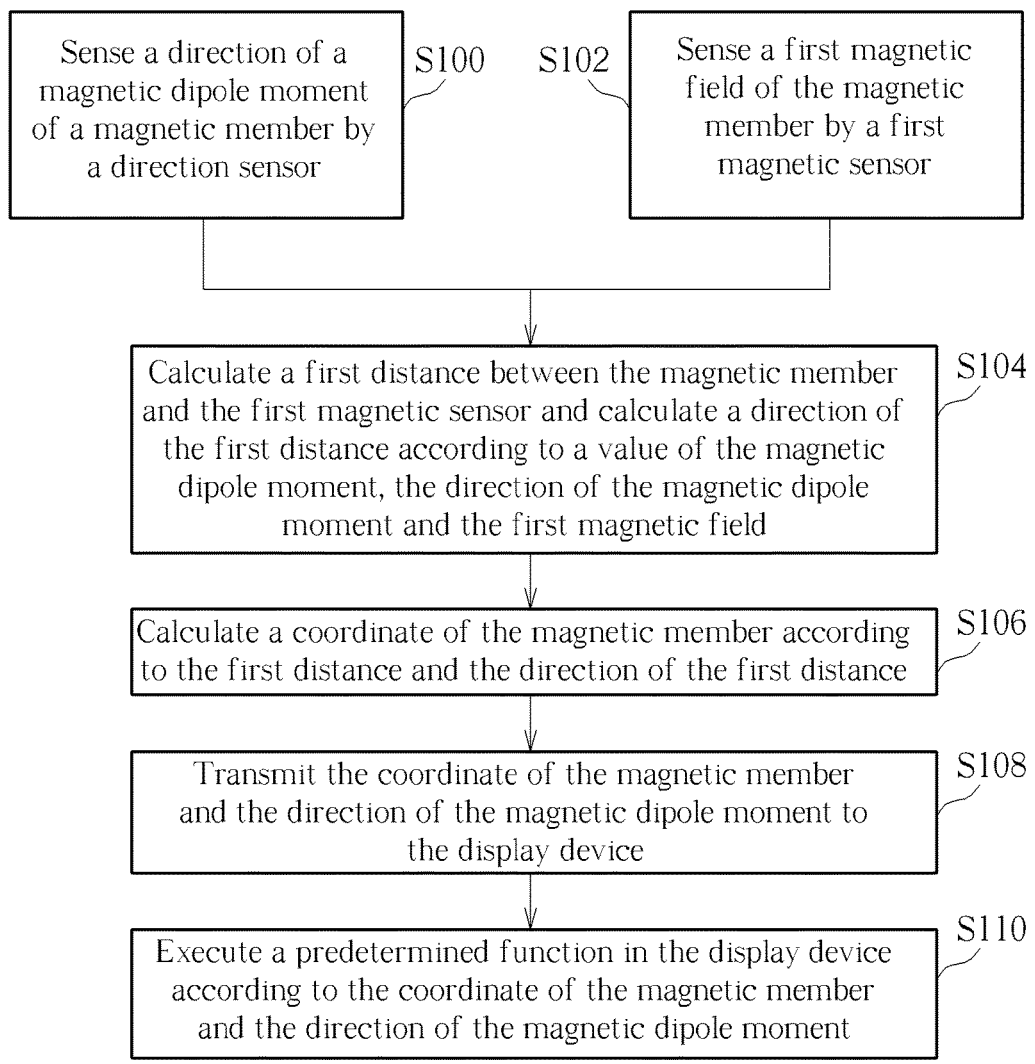
FIG. 7 is a flowchart illustrating a coordinate sensing method according to an embodiment of the invention.

Referring to FIG. 7, FIG. 7 is a flowchart illustrating a coordinate sensing method according to an embodiment of the invention. The coordinate sensing method shown in FIG. 7 can be implemented by the aforesaid coordinate sensing system 32 and display device 30. First of all, step S100 is performed to sense a direction of a magnetic dipole moment $\hat{m}$ of a magnetic member 3200 by a direction sensor 3202. At the same time, step S102 is performed to sense a first magnetic field $\vec{B}_1$ of the magnetic member 3200 by a first magnetic sensor 3222. Afterwards, step S104 is performed to calculate a first distance $r_1$ between the magnetic member 3200 and the first magnetic sensor 3222 and calculate a direction of the first distance $\hat{r}_1$ according to a value of the magnetic dipole moment m, the direction of the magnetic dipole moment $\hat{m}$ and the first magnetic field $\vec{B}_1$. Step S106 is then performed to calculate a coordinate of the magnetic member 3200 according to the first distance $r_1$ and the direction of the first distance $\hat{r}_1$. Step S108 is then performed to transmit the coordinate of the magnetic member 3200 and the direction of the magnetic dipole moment $\hat{m}$ to the display device 30. Finally, step S110 is performed to execute a predetermined function in the display device 30 according to the coordinate of the magnetic member 3200 and the direction of the magnetic dipole moment m̂. It should be noted that the predetermined function is described in the aforesaid embodiments, so it will not be depicted herein again.

Figure 8:
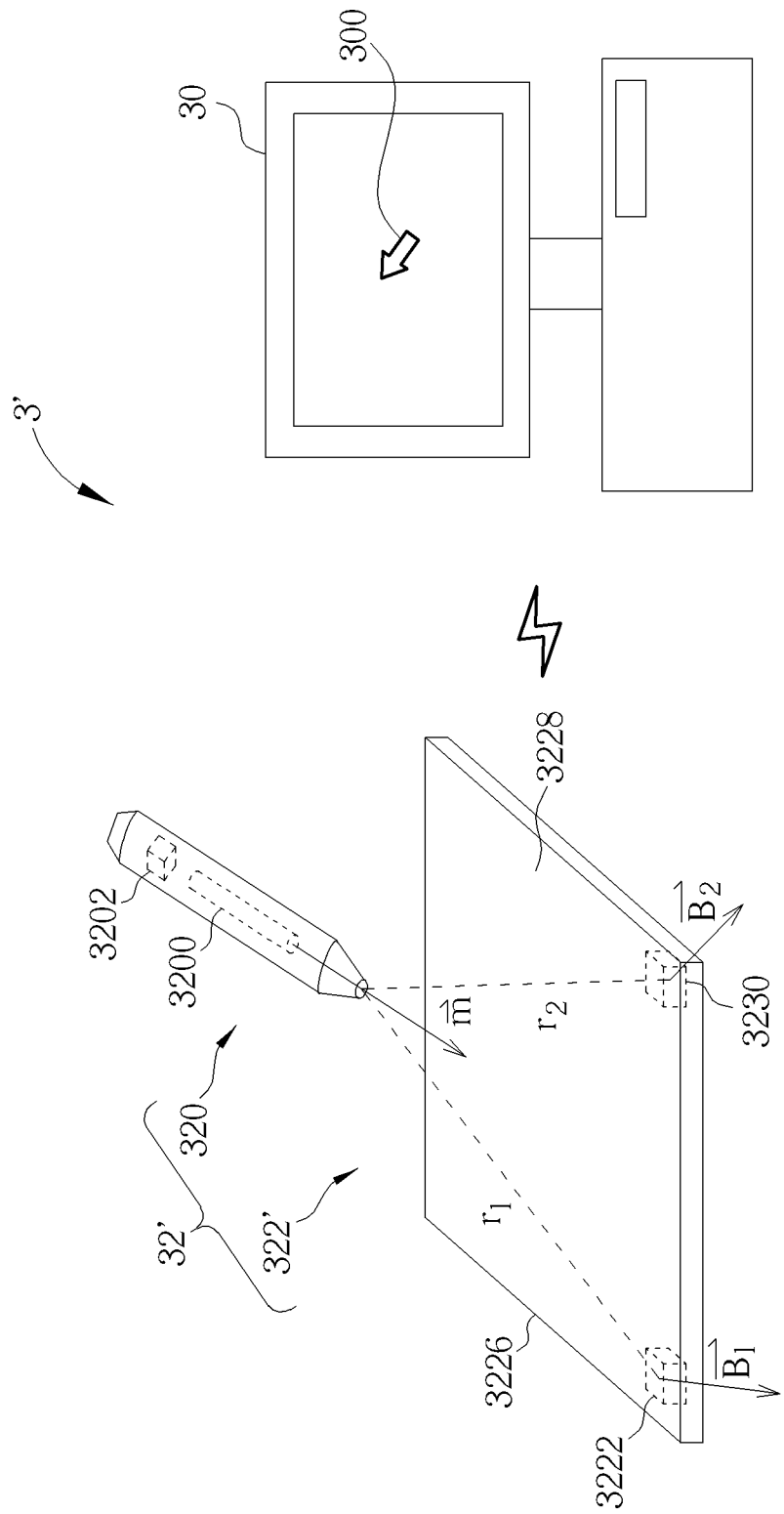
FIG. 8 is a schematic diagram illustrating a display system according to another embodiment of the invention.
Figure 9:
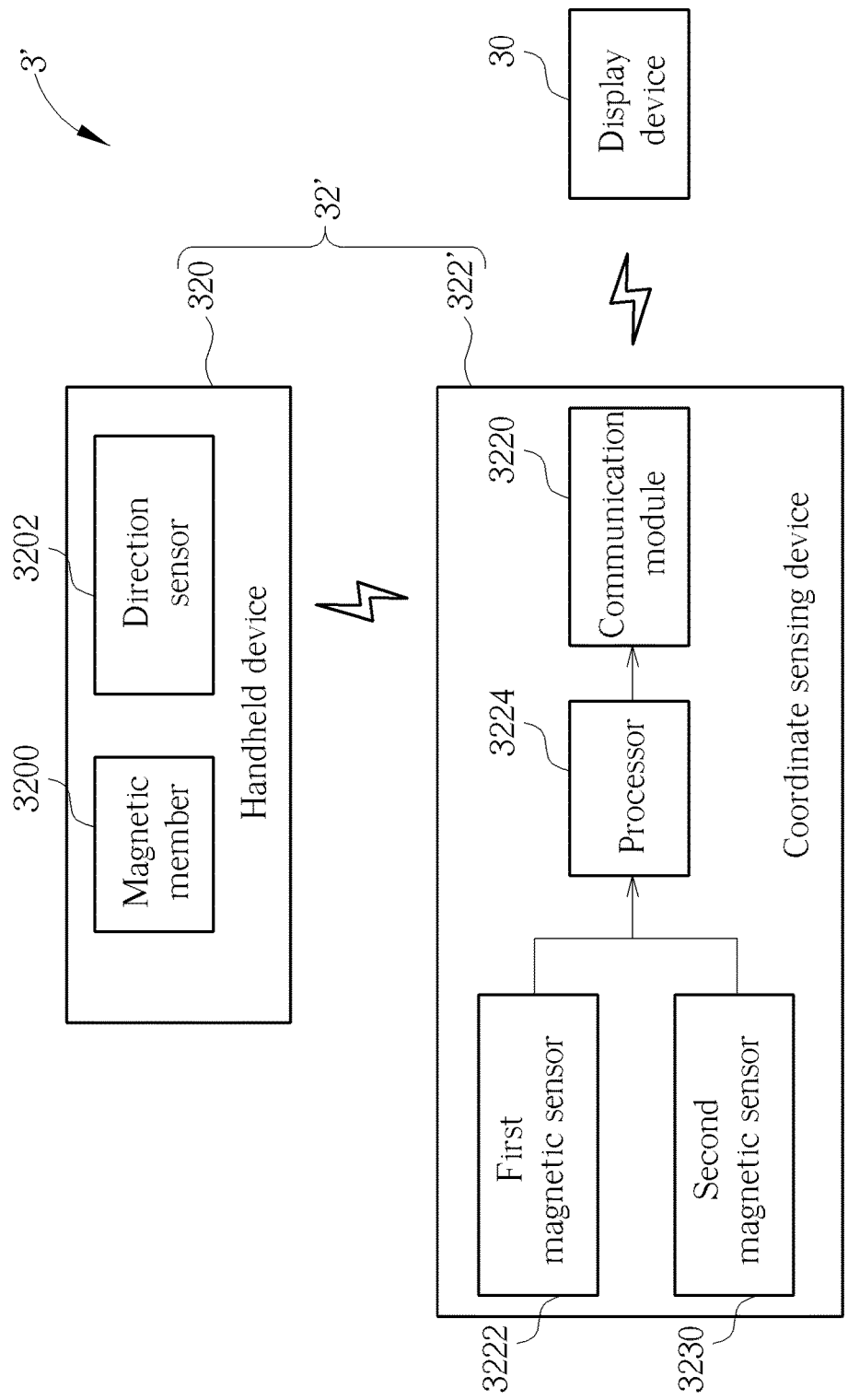
FIG. 9 is a functional block diagram illustrating the display system shown in FIG. 8.

Referring to FIGS. 8 and 9, FIG. 8 is a schematic diagram illustrating a display system 3' according to another embodiment of the invention, and FIG. 9 is a functional block diagram illustrating the display system 3' shown in FIG. 8. The main difference between the display system 3' and the aforesaid display system 3 is that the coordinate sensing device 322' of the coordinate sensing system 32' further comprises a second magnetic sensor 3230, which is disposed in the casing 3226 and electrically connected to the processor 3224. In practical applications, the second magnetic sensor 3230 may be a three-axis magnetic sensor (e.g. Hall sensor) or other magnetic sensors. It should be noted that the same elements in FIGS. 8-9 and FIGS. 2-3 are represented by the same numerals, so the repeated explanation will not be depicted herein again.

The second magnetic sensor 3230 is used for sensing a second magnetic field $\vec{B}_2$ of the magnetic member 3200 and transmitting the second magnetic field $\vec{B}_2$ to the processor 3224. Afterwards, through the aforementioned equations 1 and 8, the processor 3224 can calculate a second distance $r_2$ between the magnetic member 3200 and the second magnetic sensor 3230 and calculate a direction of the second distance $\hat{r}_2$ according to the value of the magnetic dipole moment m, the direction of the magnetic dipole moment m̂ and the second magnetic field $\vec{B}_2$. Then, by taking the second magnetic sensor 3230 to be the origin of the coordinates, the processor 3224 can calculate the coordinate of the magnetic member 3200 according to the second distance $r_2$ and the direction of the first distance $\hat{r}_2$. In other words, the invention may utilize another magnetic sensor to assist in calculating the coordinate of the magnetic member 3200, so as to enhance the accuracy of the sensed coordinate.

Compared with the prior art, the coordinate sensing system and the coordinate sensing method of the invention utilizes the direction sensor and at least one magnetic sensor to sense a 3D coordinate of the magnetic member in a space. In practical applications, the magnetic member and the direction sensor may be disposed in a handheld device including presentation pen, game joystick, remote controller, and so on, such that a user can operate the handheld device to perform a gesture to control an electronic device (e.g. display device) to execute specific function (e.g. eraser function, palm function, 3D drawing function, handwriting input function, cursor moving function, etc.).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device control system comprising:
a handheld device comprising:
  a magnetic member having a magnetic dipole moment, a Z direction of the handheld device is parallel to a direction of the magnetic dipole moment; and
  a direction sensor for sensing a direction of the magnetic dipole moment;
a magnetic sensor for sensing a magnetic field of the magnetic member; and
a processor communicating with the direction sensor and electrically connected to the magnetic sensor, the processor being used for calculating a distance between the magnetic member and the magnetic sensor and calculating a direction of the distance according to the magnetic dipole moment, the direction of the magnetic dipole moment and the magnetic field, the processor being further used for calculating a 3D coordinate of the magnetic member according to the distance and the direction of the distance relative to a line from the magnetic member to the magnetic sensor, and a display device executes a predetermined function according to the 3D coordinates of the magnetic member.

2. The system of claim 1, wherein the direction sensor is a three-axis gyro.

3. The system of claim 1, further comprising a communication module electrically connected to the processor and used for communicating with the display device and the direction sensor, the processor transmitting the coordinate of the magnetic member to the display device through the communication module.

4. The system of claim 3, further comprising a casing, wherein the magnetic sensor, the processor and the communication module are disposed in the casing, an indication plane is defined on the casing, the processor transmits the direction of the magnetic dipole moment to the display device through the communication module, and the display device executes the predetermined function according to the coordinate of the magnetic member and the direction of the magnetic dipole moment.

5. The system of claim 4, wherein when an end of the magnetic member faces the indication plane, the predetermined function is an eraser function, a palm function or a 3D drawing function.

6. The system of claim 4, wherein when an end of the magnetic member faces the indication plane and a distance between the end and the indication plane is smaller than a first threshold, the predetermined function is a handwriting input function.

7. The system of claim 4, wherein when an end of the magnetic member faces the indication plane and a distance between the end and the indication plane is larger than a second threshold, the predetermined function is a cursor moving function.

8. The system of claim 1, wherein a location of the magnetic sensor is an origin of a coordinate system used to calculate the coordinate and the magnetic field of the magnetic member sensed by the magnetic sensor relative to the origin is calculated by the following equation in polar coordinates:

$$\vec{B} = B_x \hat{i} + B_y \hat{j} + B_z \hat{k} = \frac{\mu_0}{4\pi r^3}[3(\vec{m}\cdot\hat{r})\hat{r} - \vec{m}] = \frac{\mu_0}{4\pi r^3}(3m\cos\theta\hat{r} - m\hat{k})$$

wherein $\vec{m}$ represents the magnetic dipole moment of the magnetic member and the direction of the magnetic dipole moment $\vec{m}$ is parallel to a coordinate axis z of the Cartesian coordinate system; $\vec{B}$ represents a magnetic field of the magnetic member sensed by the magnetic sensor 12 relative to the origin; $B_x$, $B_y$ and $B_z$ represent three components of the magnetic field $\vec{B}$ relative to the coordinate axes x, y and z; r represents the distance between the magnetic member and the magnetic sensor; $\hat{i}$, $\hat{j}$ and $\hat{k}$ represent three unit vectors of the coordinate axes x, y and z, θ represents an angle included between the distance r and the coordinate axis z, $\mu_0$ represents a permittivity of the air, and $\hat{r}$ represents a unit vector of the distance r in a direction from the magnetic moment to the origin.

9. The system of claim 8, wherein a component of the magnetic field $\vec{B}$ relative to the coordinate axis z is calculated by the following equation:

$$\vec{B}_z = \frac{\mu_0}{4\pi r^3}[3m\cos^2\theta\hat{k} - m\hat{k}] = \frac{\mu_0 m}{4\pi r^3}(3\cos^2\theta - 1)\hat{k}.$$

10. The system of claim 9, wherein the component of the magnetic field $\vec{B}$ relative to the coordinate axis z is calculated using $$3\cos^2\theta = \frac{4\pi r^3 B_z}{\mu_0 m} + 1.$$

11. The system of claim 8, wherein an axis of the magnetic field $\vec{B}$ is calculated in polar coordinates by $$\vec{B} = \frac{\mu_0 m}{4\pi r^3}(2\cos\theta\hat{r} + \sin\theta\hat{\theta}).$$

12. The system of claim 1, wherein the coordinate sensing system comprises only one magnetic sensor only sensing a first magnetic field of the magnetic member.

13. The system of claim 1, wherein a component of the magnetic field relative to a coordinate axis used to calculate the 3D coordinate is in inverse proportion to the distance^3.

14. The system of claim 1, wherein the direction of the magnetic dipole moment is parallel to one axis of the direction sensor.

15. A method of gesture control comprising:
sensing a direction of a magnetic dipole moment of a magnetic member by a direction sensor;
sensing a magnetic field of the magnetic member by a magnetic sensor;
calculating a distance between the magnetic member and the magnetic sensor and calculating a direction of the distance according to the magnetic dipole moment, the direction of the magnetic dipole moment and the magnetic field;
calculating a 3D coordinate of the magnetic member according to the distance and the direction of the distance relative to a line from the magnetic member to the magnetic sensor;
transmitting the 3D coordinate of the magnetic member and the direction of the magnetic dipole moment to a display device; and
executing a predetermined function in the display device according a gesture determined according to the 3D coordinates of the magnetic member and the directions of the magnetic dipole moment.

16. The method of claim 15, wherein the direction sensor is a three-axis gyro.

17. The method of claim 15, wherein when an end of the magnetic member faces the indication plane, the predetermined function is an eraser function, a palm function or a 3D drawing function.

18. The method of claim 15, wherein when an end of the magnetic member faces the indication plane and a distance between the end and the indication plane is smaller than a first threshold, the predetermined function is a handwriting input function.

19. The method of claim 15, wherein when an end of the magnetic member faces the indication plane and a distance between the end and the indication plane is larger than a second threshold, the predetermined function is a cursor moving function.

20. A display system comprising:
a display device for displaying an object; and
a coordinate sensing system comprising:
  a handheld device comprising:
    a magnetic member having a magnetic dipole moment; and
    a direction sensor for sensing a direction of the magnetic dipole moment;
  a coordinate sensing device comprising:
    a communication module for communicating with the display device and the direction sensor;
    a magnetic sensor for sensing a magnetic field of the magnetic member; and
    a processor electrically connected to the communication module and the magnetic sensor, the processor being used for calculating a distance between the magnetic member and the magnetic sensor and calculating a direction of the distance according to the magnetic dipole moment, the direction of the magnetic dipole moment, and the magnetic field, the processor being further used for calculating a 3D coordinate of the magnetic member according to the distance and the direction of the distance relative to a line from the magnetic member to the magnetic sensor;
wherein the processor transmits the 3D coordinate of the magnetic member to the display device through the communication module and the display device executes a predetermined function in the display device according to the 3D coordinates of the magnetic member.

21. The display system of claim 20, wherein the direction sensor is a three-axis gyro.

22. The display system of claim 20, wherein the coordinate sensing device further comprises a casing, the magnetic sensor, the processor and the communication module are disposed in the casing, an indication plane is defined on the casing, the processor transmits the direction of the magnetic dipole moment to the display device through the communication module, and the display device performs the predetermined function according to the 3D coordinate of the magnetic member and the direction of the magnetic dipole moment.

23. The display system of claim 22, wherein when an end of the magnetic member faces the indication plane, the predetermined function is an eraser function, a palm function or a 3D drawing function.

24. The display system of claim 22, wherein when an end of the magnetic member faces the indication plane and a distance between the end and the indication plane is smaller than a first threshold, the predetermined function is a handwriting input function.

25. The display system of claim 22, wherein when an end of the magnetic member faces the indication plane and a distance between the end and the indication plane is larger than a second threshold, the predetermined function is a cursor moving function.

\* \* \* \* \*